United States Patent Office

3,385,688
Patented May 28, 1968

3,385,688
PHOSPHONOTHIOATES AS HERBICIDES
Erik A. Regel, Mission, Kans., assignor to Chemagro Corporation, Kansas City, Mo., a corporation of New York
No Drawing. Continuation-in-part of application Ser. No. 357,761, Apr. 6, 1964. This application Sept. 15, 1964, Ser. No. 396,753
8 Claims. (Cl. 71—87)

ABSTRACT OF THE DISCLOSURE

Compounds having the formula

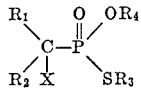

where
$R_1$ is alkyl of 1 to 8 carbon atoms,
$R_2$ is selected from the group consisting of alkyl of 1 to 8 carbon atoms, phenyl, halophenyl and benzyl, $R_1$ and $R_2$ taken together are $CH_2(CH_2)_nCH_2$ where $n$ is an integer from 1 to 3 inclusive;
$R_3$ is selected from the group consisting of alkyl of 1 to 8 carbon atoms and haloalkyl having 1 to 3 carbon atoms;
$R_4$ is selected from the group consisting of alkyl of 1 to 8 carbon atoms, alkenyl of 3 to 8 carbon atoms, alkinyl of 3 to 8 carbon atoms, phenyl, alkylphenyl, halophenyl dihalophenyl, trihalophenyl, nitrophenyl and

X is halogen of atomic weight 35 to 80, are prepared and are employed as herbicides.

---

This application is a continuation-in-part of application Ser. No. 357,761; filed Apr. 6, 1964, now Patent 3,346,669, Oct. 10, 1967.

The present invention relates to α-chloroalkyl phosphonothioates.

It is an object of the present invention to prepare novel α-chloroalkyl phosphonothioates.

Another object is to devise a novel method of preparing such compounds.

A further object is to prepare novel herbicides.

An additional object is to prepare herbicides having selective post emergent herbicide activity.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

It has now been found that these objects can be attained by preparing compounds having the formula

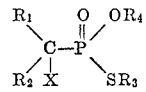

where $R_1$ is alkyl containing 1 to 8 carbon atoms, $R_2$ is alkyl containing 1 to 8 carbon atoms, phenyl, halophenyl or benzyl or $R_1$ and $R_2$ taken together is

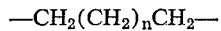

where $n$ is an integer from 1 to 3 inclusive; $R_3$ is alkyl containing 1 to 8 carbon atoms or haloalkyl containing 1 to 3 carbon atoms, and $R_4$ is alkyl of 1 to 8 carbon atoms, alkenyl of 3 to 8 carbon atoms, alkinyl of 3 to 8 carbon atoms, phenyl, halophenyl, dihalophenyl, alkylphenyl, nitrophenyl, trihalophenyl or

and X is halogen of atomic weight 35 to 80. For the best results the alkyl groups contain 1 to 4 carbon atoms.

Examples of compounds within the present invention are

O,S-dimethyl-α-chloroisopropylphosphonothioate,
O-methyl-S-ethyl-α-chloroisopropylphosphonothioate,
O,S-diethyl-α-chloroisopropylphosphonothioate,
O-propargyl-S-ethyl-α-chloroisopropylphosphonothioate,
O-o-chlorophenyl-S-ethyl-α-chloroisopropylphosphonothioate,
O-m-chlorophenyl-S-ethyl-α-chloroisopropylphosphonothioate,
O-p-chlorophenyl-S-ethyl-α-chloroisopropylphosphonothioate,
O-2,4-dichlorophenyl-S-ethyl-α-chloroisopropylphosphonothioate,
O-methyl-S-butyl-α-chloroisopropylphosphonothioate,
O-ethyl-S-butyl-α-chloroisopropylphosphonothioate,
O-phenyl-S-butyl-α-chloroisopropylphosphonothioate,
O-methyl-S-secondary butyl-α-chloroisopropylphosphonothioate,
O-p-nitrophenyl-S-methyl-α-chloro-α-methyl propylphosphonothioate,
O-methyl-S-ethyl-α-chloro-α-methyl propylphosphonothioate,
O,S-diethyl-α-chloro-α-methyl propylphosphonothioate,
O-isopropenyl carbothoxy-S-ethyl-α-chloro-α-methyl propylphosphonothioate,
O-2,4,5-trichlorophenyl-S-ethyl-α-chloro-α-methyl propylphosphonothioate,
O-m-methylphenyl-S-ethyl-α-chloro-α-methyl propylphosphonothioate,
O-phenyl-S-butyl-α-chloro-α-methyl propylphosphonothioate,
O-methyl-S-ethyl-α-chloro-α-methyl isoamylphosphonothioate,
O,S-diethyl-α-chloro-α-ethyl propylphosphonothioate,
O-methyl-S-ethyl-α-chloro-α-ethyl amylphosphonothioate,
O,S-dimethyl-α-chlorocyclopentylphosphonothioate,
O,S-diethyl-α-chlorocyclopentylphosphonothioate,
O-ethyl-S-propyl-α-chlorocyclopentylphosphonothioate,
O,S-diethyl-α-chlorocyclohexylphosphonothioate,
O-ethyl-S-butyl-α-chlorocyclohexylphosphonothioate,
O,S-diethyl-α-bromoisopropylphosphonothioate,
O,S-dimethyl-α-bromoisopropylphosphonothioate,
O-propyl-S-butyl-α-bromo-α-methyl propylphosphonothioate,
O,S,dipropyl-α-chlorocyclobutylphosphonothioate,
O-octyl-S-methyl-α-chloroisopropylphosphonothioate,
O-ethyl-S-octyl-α-chloroisopropylphosphonothioate,
O-methyl-S-3-chloropropyl-α-chloroisopropylphosphonothioate,
O-ethyl-S-chloromethyl-α-chloroisopropylphosphonothioate,
O-allyl-S-methyl-α-chloroisopropylphosphonothioate,
O-2-octenyl-S-ethyl-α-chloroisopropylphosphonothioate, O-2-octinyl-S-propyl-α-chloroisopropylphosphonothioate,
O-2,4-xylyl-S-methyl-α-chloroisopropylphosphonothioate,
O-4-butylphenyl-S-ethyl-α-chloroisopropylphosphonothioate,
O,S-dimethyl-α-chloro-α-methyl nonylphosphonothioate,
O,S-dimethyl-α-octyl nonylphosphonothioate,
O-methyl-S-ethyl-α-chloro-α-benzyl ethylphosphonothioate,
O,S-diethyl-α-chloro-α-phenyl ethylphosphonothioate,
O-methyl-S-butyl-α-chloro-α-p-chlorophenyl ethylphosphonothioate,
O-2,4-dichlorophenyl-S-ethyl-α-chloroisopropylphosphonothioate, and
O,S-dibutyl-α-chloro-α-methyl propylphosphonothioate.

The compounds of the present invention are prepared by reacting equimolar amounts of a compound having the formula $R_4OMe$ with a phosphorus containing compound having the formula

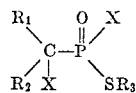

where $R_1$, $R_2$, $R_3$, $R_4$ and X are as defined previously and Me is an alkali or alkaline earth metal.

It is not possible to use a trialkyl amine and an alcohol in place of the alkali metal or alkaline earth metal alcoholate or phenolate since in such case the products of the present invention are not obtained.

The reaction of the present invention can be carried out with excess of alcoholate or phenolate if desired.

The reaction is carried out at a temperature from room temperature up to 60° C. Usually an appropriate solvent is also used such as an alcohol, e.g., methyl alcohol, ethyl alcohol, isopropyl alcohol, n-propyl alcohol, butyl alcohol or hexyl alcohol, dioxane or a hydrocarbon, e.g. toluene, xylene, benzene, hexane, petroleum ether, aromatic naphtha or the like.

Examples of starting alcoholates and phenolates are sodium methylate, potassium methylate, lithium methylate, calcium ethylate, sodium ethylate, potassium ethylate, sodium octylate, sodium propylate, sodium isopropylate, potassium butylate, sodium secondary butylate, sodium phenolate, potassium phenolate, sodium O-cresylate, potassium m-cresylate, sodium p-cresylate, sodium xylenylate, sodium p-chlorophenolate, sodioacetoacetic acid ester, sodium allylate, sodium propargylate, sodium salt of trimethylene chlorohydrin, sodium O-nitrophenolate, sodium - 2,4 - dichlorophenolate, sodium 2,4,5-trichlorophenolate.

As the starting phosphorus compounds there can be used

S-ethyl-α-chloroisopropyl phosphonochloridothioate,
S-methyl-α-chloroisopropyl phosphonochloridothioate,
S-butyl-α-chloroisopropyl phosphonochloridothioate,
S-secondary butyl-α-chloroisopropyl phosphonochloridothioate,
S-methyl-α-chloro-α-methyl propylphosphonochloridothioate,
S-ethyl-α-chloro-α-methyl propylphosphonochloridothioate,
S-butyl-α-chloro-α-methyl propyl-phosphonochloridothioate,
S-ethyl-α-chloro-α-methyl isoamylphosphonochloridothioate,
S-ethyl-α-chloro-α-ethyl propylphosphonochloridothioate,
S-ethyl-α-chloro-α-ethyl amylphosphonochloridothioate,
S-methyl-α-chlorocyclopentylphosphonochloridothioate,
S-ethyl-α-chlorocyclopentylphosphonochloridothioate,
S-propyl-α-chlorocyclopentylphosphonoochloridothioate,
S-ethyl-α-chlorocyclohexylphosphonochloridothioate,
S-butyl-α-chlorocyclohexylphosphonochloridothioate,
S-ethyl-α-bromoisopropylphosphonobromidothioate,
S-methyl-α-bromoisopropylphosphonobromidothioate,
S-butyl-α-bromo-α-methyl propylphosphonochloridothioate,
S-propyl-α-chlorocyclobutylphosphonochloridothioate,
S-octyl-α-chloroisopropylphosphonochloridothioate,
S-3-chloropropyl-α-chloroisopropylphosphonochloridothioate,
S-chloromethyl-α-chloroisopropylphosphonochloridothioate
S-propyl-α-chloroisopropylphosphonochloridothioate,
S-methyl-α-chloro-α-methyl nonylphosphonochloridothioate,
S-ethyl-α-chloro-α-benzyl ethylphosphonochloridothioate,
S-ethyl-α-chloro-α-phenyl ethylphosphonochloridothioate,
S-butyl-α-chloro-α-p-chlorophenylethylphosphonochloridothioate,
S-isopropyl-α-chloroisopropylphosphonochloridothioate,
S-isobutyl-α-chloroisopropylphosphonochloridothioate,
S-methyl-α-chloro-α-methyl butylphosphonochloridothioate,
S-ethyl-α-chloro-α-methyl hexylphosphonochloridothioate,
S-ethyl-α-chloro-α-ethyl amylphosphonochloridothioate,
S-ethyl-α-propyl butylphosphonochloridothioate,
S-ethyl-α-chloro-α-methyl heptylphosphonochloridothioate.

The starting phosphorus compounds are prepared by reacting (1) phosphorus trichloride or phosphorus tribromide with (2) a ketone having the formula

and (3) a mercaptan having the formula $R_3SH$. Equimolar quantities of the three reactants are employed.

Representative ketones which can be used are acetone, methyl ethyl ketone, diethyl ketone, methyl propyl ketone, methyl isopropyl ketone, ethyl butyl ketone, dipropyl ketone, methyl t-butyl ketone, isobutyl hexyl ketone, ethyl octyl ketone, acetophenone, phenyl acetone and p - chloroacetophenone, cyclopentanone, cyclohexanone and cyclobutanone.

Representative mercaptans which can be employed are methyl mercaptan, ethyl mercaptan, propyl mercaptan, isopropyl mercaptan, butyl mercaptan, secondary butyl mercaptan, T-butyl mercaptan, amyl mercaptan, hexyl mercaptan, octyl mercaptan, 2 - ethylhexyl mercaptan, 3-chloropropyl mercaptan and chloroethyl mercaptan.

In general, 1 mole of the ketone and 1 mole of phosphorous trichloride are mixed together at —20 to +40° C. and then 1 mole of the mercaptan is added gradually.

Example 1 illustrates the general procedure for making the starting compounds.

EXAMPLE 1

S-ethyl-α-chloro-α-methyl propylphosphonochloridothioate

Butanone (1 mole) and phosphorus trichloride (1 mole) were mixed at 0° C. and ethylmercaptan (1 mole) was added dropwise while the mixture was kept below 10° C. by cooling and agitation. Hydrogen chloride was liberated and reaction mixture became yellow. After the addition of ethylmercaptan was completed the mixture was allowed to warm up to 25° C. and agitation was continued until hydrogen chloride evolution ceased. Carbon tetrachloride (200 ml.) was added and the resulting solution was washed with water until the solution was almost neutral (pH 6). The carbon tetrachloride solution was dried over anhydrous sodium sulfate, filtered and the solvent was distilled off in vacuum. The remaining yellow oil (84% of theory) can be distilled, yielding the pure S-ethyl-α-chloro-α-methyl propylphosphonochloridothioate in 76% of theory, B.P. 0.15 80° C. $n_D^{25}$ 1.5186. Molecular weight: 235.2. Calculated: Cl, 30.2%; P, 13.2%; S, 13.7%. Found: Cl, 29.7%; P, 13.2%; S, 14.0%.

Examples of starting compounds and their physical properties are set forth in Table 1.

TABLE 1

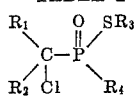

| Compound No. | $R_1$ | $R_2$ | $R_3$ | $R_4$ | Boiling Point, ° C./mm. Hg | Refractive Index |
|---|---|---|---|---|---|---|
| 1 | Me | Me | Me | Cl | (48°) 63°/0.01 | 1.5270[25] |
| 2 | Me | Me | Et | Cl | 55-60°/0.005 | 1.5166[28] |
| 3 | Me | Me | isoPr | Cl | 70°/0.02 | 1.5055[30] |
| 4 | Me | Me | Bu | Cl | 80-85°/0.04 | 1.5085[25] |
| 5 | Me | Me | secBu | Cl | 75°/0.02 | 1.5058[30] |
| 6 | Me | Me | isoBu | Cl | 75°/0.04 | 1.5052[30] |
| 7 | Me | Et | Me | Cl | 75°/0.15 | 1.5265[28] |
| 8 | Me | Et | Bu | Cl | 100°/0.1 | 1.5095[25] |
| 9 | Me | Et | Et | Cl | 80°/0.15 | 1.5186[25] |
| 10 | Me | Pr | Me | Cl | 94-98°/0.02 | 1.5200[25] |
| 11 | Me | Am | Et | Cl | 113°/0.1 | 1.5030[28] |
| 12 | Et | Bu | Et | Cl | 100°/0.02 | 1.5097[29] |
| 13 | Pr | Pr | Et | Cl | | 1.5070[23] |
| 14 | Me | Hex | Et | Cl | | 1.5010[28] |
| 15 | —(CH₂)₄— | | Me | Cl | 89°/0.10 | 1.5450[26] |
| 16 | —(CH₂)₄— | | Bu | Cl | 118°/0.15 | 1.5232[28] |
| 17 | —(CH₂)₅— | | Bu | Cl | 130°/0.1 | 1.5261[25] |
| 18 | Me | PhCH₂ | Me | Cl | | 1.5736[20] |
| 19 | Me | PhCH₂ | Bu | Cl | | 1.5550[28] |
| 20 | Me | Ph | Me | Cl | | 1.5550[28] |
| 21 | Me | Ph | Bu | Cl | | 1.5691[20] |
| 22 | Me | p-ClPh | Bu | Cl | | 1.5840[27] |
| 23 | Me | Me | Cl(CH₂)₃— | Cl | 100°/0.03 | 1.5320[20] |
| 24 | Me | Me | Pinanyl | Cl | 135°/0.2 | 1.5262[20] |
| 25 | Me | Et | Cl(CH₂)₃— | Cl | 125°/0.04 | 1.5306[20] |
| 26 | Me | isoBu | Me | Cl | 82°/0.1 | 1.5163[20] |
| 27 | Me | isoBu | Et | Cl | 88°/0.12 | 1.5085[20] |
| 28 | Et | Et | Me | Cl | 94°/0.15 | 1.5300[20] |
| 29 | Et | Et | Et | Cl | 93°/0.3 | 1.5229[20] |
| 30 | —(CH₂)₄— | | Et | Cl | 82°/0.06 | 1.5353[26] |
| 31 | —(CH₂)₄— | | Pr | Cl | 90°/0.03 | 1.5285[23] |
| 32 | isoBu | isoBu | Et | Cl | 110°/0.2 | 1.5375[30] |
| 33 | —(CH₂)₅— | | Et | Cl | 110°/0.2 | 1.5375[30] |

When PBr₃ is used in place of PCl₃ examples of the starting compounds formed are shown in Table 2.

TABLE 2

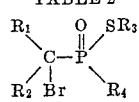

| $R_1$ | $R_2$ | $R_3$ | $R_4$ | B.P. | Refractive Index |
|---|---|---|---|---|---|
| Me | Me | Me | Br | M.P. 40° | |
| Me | Et | Et | Br | | 1.5655[20] |
| Me | Me | Et | Br | 100°/0.005 | 1.5745[29] |

The compounds of the present invention are prepared as shown in Example 2.

EXAMPLE 2

Metallic sodium (0.07 mole) was added portionwise to 100 ml. of ethanol and the mixture was stirred until all the sodium was dissolved. To this ethanolic solution of sodium ethylate was added dropwise S-ethyl-α-chloroisopropyl-chloridophosphonothioate (0.07 mole). An exothermic reaction took place and the mixture temporarily reached 60° C. and immediate precipitation of sodium chloride occurred. The mixture was agitated for 2 hours and allowed to stand for an additional 15 hours at room temperature, until a pH of 7 was obtained. The mixture was then diluted with benzene and the benzene solution washed with water, dried over anhydrous sodium sulfate, filtered and the solvent evaporated in a vacuum. The resulting crude O,S-diethyl-α-chloroisopropylphosphonothioate (0.06 mole) was obtained as a colourless oil. After purification by distillation in vacuum 0.05 mole of the pure ester was obtained (72% yield) B.P.$_{0.02}$ 70° C., $n_D^{20}$ 1.4825.

The compounds of the present invention made by reacting the appropriate S-substituted-haloalkylhalothioate with the appropriate sodium alcoholate or phenolate in the manner shown in Example 2 are set forth in Table 3.

TABLE 3

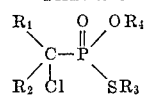

| Compound No. | $R_1$ | $R_2$ | $R_3$ | $R_4$ | B.P. | Refractive Index |
|---|---|---|---|---|---|---|
| 1 | Me | Me | Me | Me | 49-53°/0.005 | 1.4911[23] |
| 2 | Me | Me | Et | Me | 58-62°/0.008 | 1.5000[27] |
| 3 | Me | Me | Et | Et | 80°/0.02 | 1.4825[20] |
| 4 | Me | Me | Et | CH₂C-CH | 79°/0.007 | 1.4941[29] |
| 5 | Me | Me | Et | Ph | 125°/0.005 | 1.5385[20] |
| 6 | Me | Me | Et | o-ClPh | 130°/0.005 | 1.5515[20] |
| 7 | Me | Me | Et | m-ClPh | 135°/0.01 | 1.5477[20] |
| 8 | Me | Me | Et | p-ClPh | 128-132°/0.01 | 1.5477[20] |
| 9 | Me | Me | Et | 2,4-Cl₂Ph | 140°/0.05 | 1.5574[20] |
| 10 | Me | Me | Bu | Me | 72-74°/0.01 | 1.4812[25] |
| 11 | Me | Me | Bu | Et | 96°/0.01 | 1.4861[20] |
| 12 | Me | Me | Bu | Ph | 133°/0.002 | 1.5285[25] |
| 13 | Me | Me | Bu | p-ClPh | 170°/0.002 | 1.5365[26] |

TABLE 3

| Compound No. | R₁ | R₂ | R₃ | R₄ | B.P. | Refractive Index |
|---|---|---|---|---|---|---|
| 14 | Me | Me | sec-Bu | Me | 59–62°/0.05 | 1.4897 $^{25}$ |
| 15 | Me | Et | Me | p-NO₂Ph | 180°/0.07 | 1.5677 $^{20}$ |
| 16 | Me | Et | Et | Me | 81°/0.06 | 1.4972 $^{20}$ |
| 17 | Me | Et | Et | Et | 72°/0.02 | 1.4932 $^{20}$ |
| 18 | Me | Et | Et | (¹) | 125–130°/0.04 | 1.5047 $^{20}$ |
| 19 | Me | Et | Et | 2,4,5-Cl₃Ph | 168°/0.3 | 1.5638 $^{26}$ |
| 20 | Me | Et | Et | m-CH₃Ph | 128°/0.01 | 1.5350 $^{25}$ |
| 21 | Me | Et | Bu | Ph | 150°/0.005 | 1.5295 $^{25}$ |
| 22 | Me | iso-Bu | Et | Me | 75°/0.08 | 1.4883 $^{29}$ |
| 23 | Et | Et | Et | Et | 77°/0.03 | 1.4916 $^{20}$ |
| 24 | Et | Bu | Et | Me | 103°/0.04 | 1.4935 $^{25}$ |
| 25 | CH₂CH₂CH₂ \| CH₂ | Me | Me |  | 83°/0.08 | 1.5127 $^{25}$ |
| 26 | CH₂CH₂CH₂ \| CH₂ | Et | Et |  | 82°/0.02 | 1.4967 $^{27}$ |
| 27 | CH₂CH₂CH₂ \| CH₂ | Pr | Et |  | 97°/0.01 | 1.5028 $^{20}$ |
| 28 | CH₂CH₂CH₂ \| CH₂CH₂ | Et | Et |  | 99°/0.03 | 1.5077 $^{2}$ |
| 29 | CH₂CH₂CH₂ \| CH₂CH₂ | Bu | Et |  | 130°/0.01 | 1.4981 |

¹ $\overset{CH_3}{\underset{}{-C}}=CHCO_2Et.$

By substituting S-ethyl-α-bromoisopropylbromidophosphonothioate in Example 2 for the corresponding chloroido compound there was produced O,S-diethyl-α-bromoisopropylphosphonothioate, B.P., 79° C.$_{0.02mm.}$; Refraction Index, 1.5056$^{26}$. This is identified as compound 30 in the subsequent tables.

The compounds of the present invention can be used alone as herbicides but it has been found desirable to apply them to the plants or soil surrounding the plants, together with inert solids to form dusts or, more preferably, suspended in a suitable liquid diluent, preferably comprising water. They can be applied at widely varying rates, e.g. from 0.1–30 lbs./acre.

There can also be added surface active agents or wetting agents and inert solids in the liquid formulations. The active ingredient can be from 0.01 to 95% by weight of the entire composition when it is employed in such formulations.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g., ethylene glycol monomethyl ether and diethylene glycol monomethyl ether, alcohols, e.g., ethanol, methanol, isopropanol, amyl alcohol, ethylene glycol, propylene glycol, butyl carbitol acetate and glycerine. Mixtures of water and organic solvents, either as solutions or emulsions, can be employed.

The novel herbicides can also be applied as aerosols, e.g., by dispersing them in air by means of a compressed gas such as dichlorodifluoromethane or trichlorofluoromethane and other Freons, for example.

The herbicides of the present invention can also be applied with adjuvants or carriers such as talc, pyrophyllite, synthetic fine silica, Attapulgus clay (Attaclay), kieselguhr, chalk, diatomaceous earth, lime, calcium carbonate, bentonite, fuller's earth, cottonseed hulls, what flour, soybean flour, pumice, tripoli, wood flour, walnut shell flour, redwood flour and lignin.

As stated it is frequently desirable to incorporate a surface active agent in the herbicidal compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propylnaphthalene sulfonic acid, (di-2-ethylhexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyltaurate, Turkey red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide-propylene oxide condensation products, e.g., Pluronic 61 (molecular weight 1000), sorbitan sesquioleate, polyethylene glycol ester of tall oil acids, sodium octyl phenoxyethoxyethyl sulfate, tris (polyoxyethylene) sorbitan monostearate (Tween 60), sodium dihexyl sulfosuccinate. The solid and liquid formulations can be prepared by any of the conventional procedures.

EXAMPLE 3

Tests for postemergent herbicidal activity were carried out in the following manner: Flax, sugar beets, radish, wheat and oat seeds were planted in soil contained in flats measuring 14″ x 10″ x 3½″. Ten to 14 days after planting and the plants had emerged from the soil formulations and dilutions of the test chemicals were made and applied to the plants growing in the flats at the indicated pounds of active ingredient per acre.

The formulation consisted of preparing a 2 pound per gallon test chemical in a pre-mix with the following composition. The parts are expressed in the following formulation by volume.

(Mixture of mono, di- and trimethyl naphthalenes)
(Velsicol AR 50 G) _____ 8
Butyl carbitol acetate _____ 1
Triton X 161 (mixture of p-octyl phenol-ethylene oxide adduct containing about 16 ethylene oxide units together with a sodium alkylphenylsulfonate) ____ 1

Appropriate dilutions in water of the formulated material were applied to the plants growing in the flats. After 5 days observations and records were made of the test chemical on the five planted crops.

Results were based on a 0 to 10 scale, where 0 indicates no damage or effect and 10 indicates a complete kill of the plant.

TABLE 4

| Compound No. | Lbs./Acre | Flax | S. Beets | Radish | Wheat | Oats |
|---|---|---|---|---|---|---|
| 1 | 20 | 9 | 9 | 6 | 0 | 7 |
|   | 5  | 0 | 3 | 1 | 2 | 3 |
| 2 | 20 | 9 | 10 | 9 | 2 | 7 |
|   | 5  | 1 | 1 | 1 | 0 | 0 |
| 3 | 20 | 10 | 10 | 9 | 9 | 10 |
|   | 5  | 5 | 9 | 6 | 3 | 7 |
| 4 | 8  | 9 | 10 | 9 | 9 | 8 |
|   | 2  | 3 | 2 | 3 | 2 | 4 |
| 5 | 8  |   |   |   |   |   |
|   | 2  | 9 | 10 | 9 | 9 | 9 |
| 6 | 8  | 9 | 10 | 10 | 9 | 9 |
|   | 2  | 5 | 6 | 3 | 7 | 6 |
| 7 | 8  | 9 | 10 | 9 | 9 | 9 |
|   | 2  | 3 | 3 | 3 | 3 | 4 |
| 8 | 8  | 9 | 9 | 9 | 9 | 8 |
|   | 2  | 5 | 8 | 3 | 4 | 7 |
| 9 | 8  | 7 | 10 | 8 | 7 | 10 |
|   | 2  | 5 | 4 | 3 | 6 | 7 |
| 10 | 20 | 9 | 9 | 9 | 9 | 10 |
|    | 5  | 7 | 9 | 7 | 7 | 4 |
| 11 | 20 | 10 | 10 | 10 | 5 | 7 |
|    | 5  | 5 | 10 | 7 | 3 | 7 |
| 12 | 20 |   |   | 0 | 0 | 5 |
|    | 5  |   |   | 0 | 0 | 8 |
| 13 | 20 | 0 | 0 | 3 | 0 | 4 |
|    | 5  | 4 | 0 | 0 | 0 | 0 |
| 14 | 20 | 9 | 10 | 8 | 3 | 5 |
|    | 5  | 2 | 1 | 0 | 0 | 0 |
| 15 | 20 | 10 | 10 | 10 | 5 | 6 |
|    | 5  | 1 | 10 | 7 | 7 | 7 |
| 16 | 20 | 9 | 10 | 9 | 6 | 8 |
|    | 5  | 3 | 8 | 6 | 0 | 8 |
| 17 | 20 | 9 | 10 | 8 | 7 | 8 |
|    | 5  | 5 | 8 | 6 | 3 | 7 |
| 18 | 10 | 6 | 6 | 6 | 3 | 6 |
|    | 2  | 0 | 0 | 1 | 0 | 0 |
| 19 | 8  | 7 | 9 | 7 | 8 | 7 |
|    | 2  | 4 | 1 | 3 | 2 | 1 |
| 20 | 8  | 7 | 10 | 8 | 8 | 7 |
|    | 2  | 5 | 6 | 4 | 4 | 6 |
| 21 | 20 | 5 | 3 | 4 | 5 | 5 |
|    | 5  | 0 | 0 | 0 | 0 | 0 |
| 22 | 20 | 10 | 10 | 8 | 6 | 9 |
|    | 5  | 5 | 8 | 6 | 3 | 7 |
| 23 | 8  | 9 | 10 | 9 | 9 | 9 |
|    | 2  | 4 | 4 | 3 | 2 | 6 |
| 24 | 20 |   |   |   |   |   |
|    | 5  | 9 | 9 | 10 | 8 | 9 |
| 25 | 20 | 10 | 10 | 9 | 8 | 8 |
|    | 5  | 9 | 10 | 9 | 8 | 8 |
| 26 | 8  | 9 | 9 | 9 | 9 | 9 |
|    | 2  | 4 | 3 | 3 | 6 | 5 |
| 27 | 8  | 10 | 10 | 10 | 9 | 10 |
|    | 2  | 2 | 9 | 6 | 0 | 3 |
| 28 | 8  | 10 | 10 | 10 | 9 | 9 |
|    | 2  | 7 | 9 | 7 | 6 | 7 |
| 29 | 20 | 6 | 9 | 9 | 7 | 7 |
|    | 5  | 5 | 6 | 6 | 0 | 0 |
| 30 | 8  | 9 | 10 | 7 | 9 | 9 |
|    | 2  | 2 | 1 | 0 | 3 | 2 |

EXAMPLE 4

Several of the more promising compounds tested in Table 4 were subjected to a secondary screening for post-emergent herbicide activity using the procedure described in Example 3 but extending the plants tested to include cucumbers, beans, cotton, corn and alfalfa.

The results are shown in Table 5.

TABLE 5

| Compound No. | Lbs./Acre | Oats | Cucumbers | Bean | Cotton | Wheat | Flax | Corn | Radish | S. Beet | Alfalfa |
|---|---|---|---|---|---|---|---|---|---|---|---|
| 10 | 10 | 8 | 6 | 7 | 3 | 5 | 9 | 9 | 10 | 10 | 10 |
|    | 5  | 2 | 5 | 6 | 4 | 8 | 8 | 9 | 7 | 9 | 6 |
|    | 2  | 0 | 0 | 1 | 0 | 0 | 2 | 6 | 1 | 0 | 1 |
|    | 1  | 0 | 0 | 0 | 2 | 0 | 0 | 2 | 2 | 3 | 3 |
| 12 | 10 | 4 | 9 | 6 | 0 | 3 | 8 |   | 5 | 9 | 1 |
|    | 5  | 0 | 5 | 5 | 0 | 0 | 1 |   | 2 | 7 | 0 |
|    | 2  | 0 | 0 | 1 | 0 | 0 | 0 |   | 1 | 2 | 0 |
|    | 1  | 0 | 0 | 1 | 0 | 0 | 0 |   | 1 | 0 | 0 |
| 11 | 10 | 6 | 7 | 7 | 3 | 6 | 10 | 7 | 10 | 10 | 10 |
|    | 5  | 4 | 5 | 4 | 3 | 2 | 4 | 3 | 4 | 7 | 10 |
|    | 2  | 0 | 3 | 3 | 0 | 0 | 2 | 2 | 2 | 3 | 3 |
|    | 1  | 0 | 3 | 2 | 0 | 0 | 2 | 2 | 1 | 0 | 1 |
| 3  | 10 | 9 | 10 | 8 | 4 | 8 | 7 | 7 | 9 | 9 | 9 |
|    | 5  | 9 | 7 | 7 | 3 | 0 | 6 | 7 | 7 | 9 | 9 |
|    | 2  | 3 | 6 | 4 | 0 | 0 | 3 | 2 | 5 | 6 | 0 |
|    | 1  | 0 | 6 | 4 | 0 | 0 | 3 | 1 | 5 | 6 | 0 |
| 25 | 10 | 8 | 8 | 9 | 7 | 9 | 10 | 10 | 10 | 10 | 10 |
|    | 5  | 9 | 10 | 8 | 2 | 7 | 9 | 8 | 10 | 10 | 10 |
|    | 2  | 2 | 5 | 3 | 0 | 6 | 5 | 6 | 8 | 9 | 9 |
|    | 1  | 1 | 1 | 0 | 0 | 0 | 2 | 2 | 3 | 2 | 1 |

O,S-diethyl-α-chloroisopropyl-phosphonothioate (Compound No. 3) it will be observed showed selectivity at the 5 lbs./acre rate, affecting oats and leaving wheat relatively unharmed. On the other hand O-phenyl-S-ethyl-α-chloroisopropyl phosphonothioate showed strong general herbicidal activity at 2 lbs./acre. O-methyl-S-ethyl-α-chloro-α-butyl propyl-phosphonothioate and O,S-dimethyl-α-chlorocyclopentylphosphonothioate both showed general herbicidal activity at 5 lbs./acre.

I claim:
1. A method of killing plants comprising applying to the plants a herbicidally effective amount of a compound having the formula

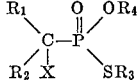

where
  $R_1$ is alkyl of 1 to 4 carbon atoms,
  $R_2$ is selected from the group consisting of alkyl of 1 to 4 carbon atoms, phenyl, halophenyl and benzyl, $R_1$ and $R_2$ taken together are $CH_2(CH_2)_nCH_2$ where $n$ is an integer from 1 to 3 inclusive;
  $R_3$ is selected from the group consisting of alkyl of 1 to 4 carbon atoms and haloalkyl having 1 to 3 carbon atoms;
  $R_4$ is selected from the group consisting of alkyl of 1 to 4 carbon atoms, alkenyl of 3 carbon atoms, alkynyl of 3 carbon atoms, phenyl alkylphenyl having alkyl groups of 1-4 carbon atoms, halophenyl, dihalopheny, trihalophenyl, nitrophenyl and

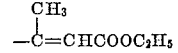

and
X is halogen of atomic weight 35 to 80.

2. A method according to claim 1 wherein the compound is O-alkyl-S-alkyl-α-chloro-α-alkyl alkylphosphonothioate wherein each alkyl group has 1 to 4 carbon atoms.

3. A method according to claim 1 wherein the compound is O - alkyl - S - alkyl - α - chloro - α - methyl alkylphosphonothioate wherein each alkyl group has 1 to 4 carbon atoms.

4. A method according to claim 1 wherein the compound is O - ethyl - S - ethyl - α - chloroisopropyl - phosphonothioate.

5. A method according to claim 4 comprising killing oats in a field of wheat by applying to the wheat field an amount of said compound which is herbicidal to oats but nonherbicidal to wheat.

6. A method according to claim 1 wherein the compound in O-phenyl-S-alkyl-α-chloro-α-alkyl alkylphosphonothioate wherein each alkyl group has 1 to 4 carbon atoms.

7. A method according to claim 1 wherein the compound is O-alkyl-S-alkyl-α-chlorocycloalkylphosphonothioate wherein each alkyl group has 1 to 4 carbon atoms and the cycloalkyl group has 5 to 6 carbon atoms.

8. A method according to claim 7 wherein the compound is O,S-dimethyl-α-chlorocyclopentylphosphonothioate.

References Cited

UNITED STATES PATENTS

| | | | |
|---|---|---|---|
| 2,708,204 | 5/1955 | Bell et al. | 260—940 |
| 2,927,014 | 3/1960 | Goyette | 71—2.7 |
| 3,047,605 | 7/1962 | Schrader | 260—940 |
| 3,094,405 | 6/1963 | Toy et al. | 71—2.7 |

LEWIS GOTTS, *Primary Examiner.*

G. HOLLRAH, *Assistant Examiner.*